(12) United States Patent
McVicar

(10) Patent No.: US 6,976,677 B1
(45) Date of Patent: Dec. 20, 2005

(54) CONVERTIBLE GAMING STEERING WHEEL WITH INTERNAL RETRACTABLE SUPPORTS

(75) Inventor: David McVicar, El Dorado, CA (US)

(73) Assignee: Logitech Europe S.A., Romanel-sur Morges (CH)

(*) Notice: Subject to any disclaimer, the term of this patent is extended or adjusted under 35 U.S.C. 154(b) by 0 days.

(21) Appl. No.: 10/846,478

(22) Filed: May 14, 2004

(51) Int. Cl.[7] ............................................. A63B 9/22
(52) U.S. Cl. ........................ 273/148 B; 463/46; 463/47
(58) Field of Search .............................. 463/36, 37, 46, 463/47; 273/148 B; D21/326, 333

(56) References Cited

U.S. PATENT DOCUMENTS

| | | | | |
|---|---|---|---|---|
| 2,663,603 A | * | 12/1953 | Newman | 108/43 |
| 2,697,018 A | * | 12/1954 | Georgides | 108/43 |
| 2,770,514 A | * | 11/1956 | Idso | 108/43 |
| 5,207,791 A | * | 5/1993 | Scherbarth | 273/148 B |
| 5,375,831 A | * | 12/1994 | Hsien-Chung | 273/148 B |
| 6,290,228 B1 | * | 9/2001 | Roberts et al. | 273/148 B |
| 2003/0067111 A1 | * | 4/2003 | Swan et al. | 273/148 R |

* cited by examiner

Primary Examiner—Raleigh W. Chiu
(74) Attorney, Agent, or Firm—Townsend and Townsend and Crew LLP

(57) ABSTRACT

Embodiments of the present invention provide a device and a method of supporting a game controller such as a steering wheel on different surfaces including a stable physical structure such as a desk or a table and the lap of the user. The game controller includes a convertible support mechanism that converts the game controller from a retracted, desktop position to an extended, sitting/lap position. In specific embodiments, the support mechanism includes left and right support members that are movable outwardly to the extended position for providing support on the user's lap and retractable inwardly into the retracted position for providing support on a desk or table top. The support members each include a support surface at a bottom thereof. The left and right support members in the extended position are configured to rest on the lap of a user in a lap mode by contacting legs of the user with the left support surface of the left support member and the right support surface of the right support member.

27 Claims, 5 Drawing Sheets

CONVERTIBLE GAMING STEERING WHEEL WITH INTERNAL RETRACTABLE SUPPORTS

CROSS-REFERENCES TO RELATED APPLICATIONS

Not applicable

BACKGROUND OF THE INVENTION

The present invention relates generally to game control equipment and, more particularly, to a device and a method for supporting a game controller on different surfaces including a table or desk top and the lap of the user.

Certain game controllers such as steering wheels need a sturdy support to provide the user with the desired game playing experience. One conventional way of providing support for a game controller such as a steering wheel is to attach the game controller to a desk, a table, or the like. The need to mount the game controller to a stable, typically large, physical structure such as a desk or a table limits the versatility and mobility of the game controller. It may be inconvenient, for instance, to provide a support structure in the living room for the game controller or to attach and detach the game controller from the support structure before and after each play.

BRIEF SUMMARY OF THE INVENTION

Embodiments of the present invention provide a device and a method of supporting a game controller such as a steering wheel on different surfaces including a stable physical structure such as a desk or a table and the lap of the user. The game controller includes a convertible support mechanism that converts the game controller from a retracted, desktop position to an extended, sitting/lap position. In specific embodiments, the support mechanism includes sliding supports that are slidable outwardly to the extended position for providing support on the user's lap and retractable inwardly into the retracted position for providing support on a desk or table top.

In accordance with an aspect of the present invention, a convertible game controller device comprises a game controller body, a left support member movably connected to the game controller body, and a right support member movably connected to the game controller body. The left support member is movable between a retracted position and an extended position. The left support member is movable inwardly to the right toward the game controller body to the retracted position and outwardly to the left away from the game controller body to the extended position. The left support member has a left support surface at a bottom thereof. The right support member is movable between the retracted position and the extended position. The right support member is movable inwardly to the left toward the game controller body to the retracted position and outwardly to the right away from the game controller body to the extended position. The right support member has a right support surface at a bottom thereof.

In some embodiments, the left support member and the right support member in the extended position are configured to rest on the lap of a user in a lap mode by contacting legs of the user with the left support surface of the left support member and the right support surface of the right support member. The left support member and the right support member are disposed at least partially inside the game controller body in the retracted position. The left support member includes a left side bottom contact location in a front portion of the left support surface, and the right support member includes a right side bottom contact location in a front portion of the right support surface. The game controller body includes a rear bottom contact location in a rear portion of the game controller body. The left side bottom contact location, the right side bottom contact location, and the rear bottom contact location are configured to contact and rest on a desk top in a desktop mode with the left and right support members in the extended position or the retracted position. The rear bottom contact location is disposed lower than the left and right side bottom contact locations with respect to a bottom of the game controller body to tilt the game controller body forward by a desktop tilt angle in the desktop mode. The desktop tilt angle is typically about 2–5°, but may be about 10' or higher.

In specific embodiments, the left support surface has a rear portion which is inclined upward with respect to a front portion of the left support member. The right support surface has a rear portion which is inclined upward with respect to a front portion of the right support member. The inclined left support surface and the inclined right support surface in the extended position are configured to rest on the lap of the user to tilt the game controller body backward by a lap tilt angle in the lap mode. The lap tilt angle may be about 5°. A rear part of the game controller body including the rear bottom contact location is disposed between the legs of the user in the lap mode.

In some embodiments, the device includes one or more frictional members coupled to at least one of the left side bottom contact location, the right side bottom contact location, and the rear bottom contact location. The left support member and the right support member may be disposed side-by-side in the retracted position. Alternatively, one of the left and right support members is received at least partially inside the other of the left and right support member in the retracted position. The left support member is slidable relative to the game controller body and the right support member is slidable relative to the game controller body.

DETAILED DESCRIPTION OF THE INVENTION

Figure 1:
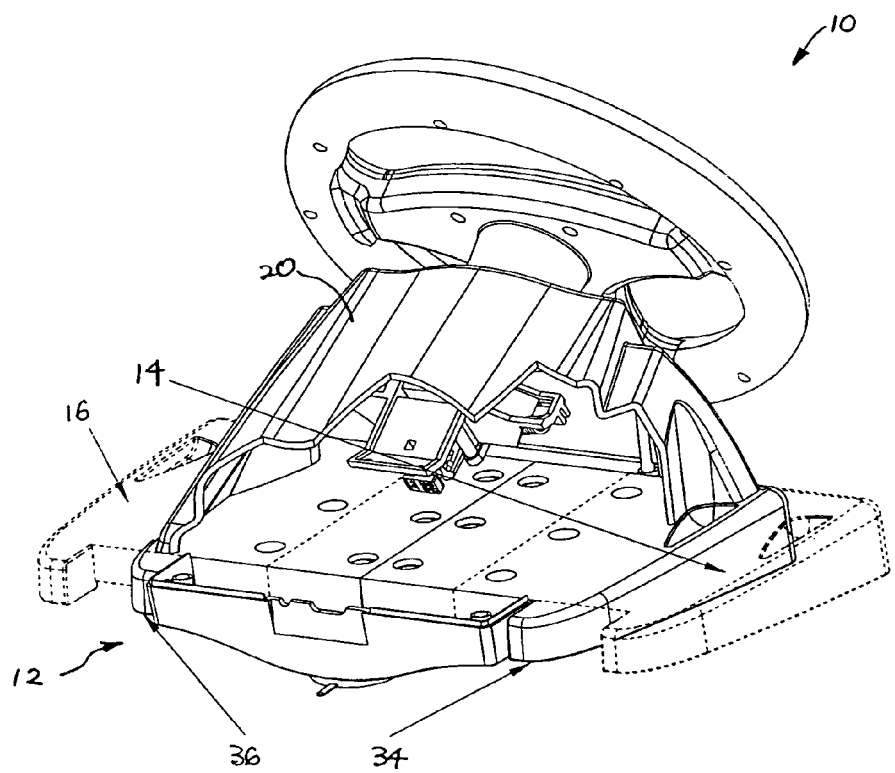
FIG. 1 is a perspective view of a convertible gaming steering wheel according to an embodiment of the present invention.

FIG. 1 shows a game controller in the form of a steering wheel 10 which includes a supporting mechanism 12 that has a left support member 14 and a right support member 16. FIG. 1 shows the support members 14, 16 in a retracted position. The left support member 14 is slidable outwardly to the left and the right support member 16 is slidable outwardly to the right to an extended position, as shown in phantom in FIG. 1.

Figure 2:
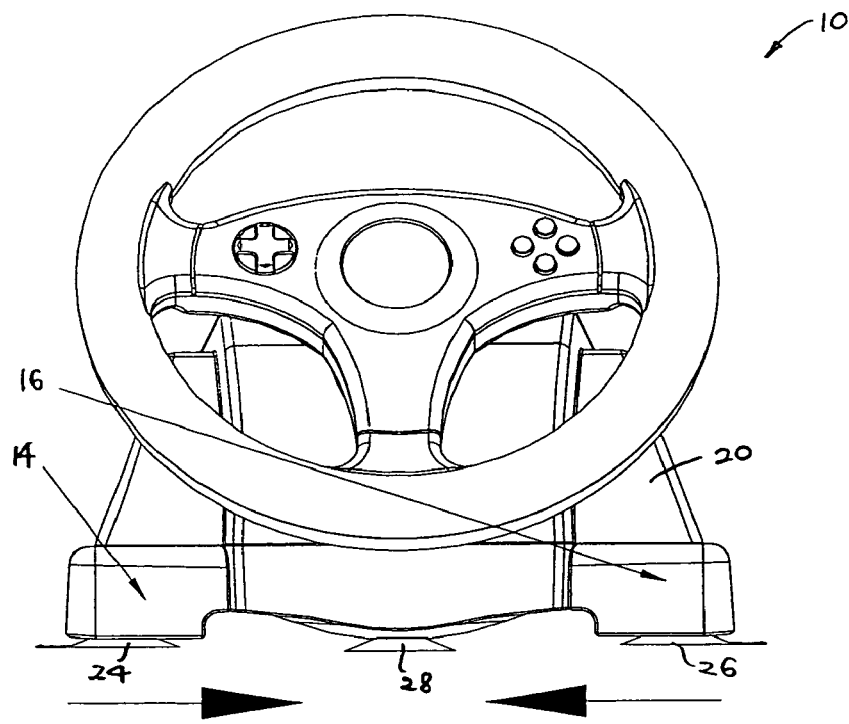
FIG. 2 is a front elevational view of the convertible gaming steering wheel of FIG. 1 showing the slidable supports in a retracted position.

In the desktop mode as further illustrated in FIG. 2, the support members 14, 16 are fully retracted and contained inside the steering wheel body or housing 20. The left side bottom contact location 24 of the left support member 14, the right side bottom contact location 26 of the right support member 16, and the rear bottom contact location 28 at the rear of the steering wheel body 20 rest on the desk or table top to support the steering wheel 10. In the specific embodiment shown, frictional members such as suction cups or rubber-type surfaces are provided at these bottom contact locations 24, 26, 28 to provide suction or friction to resist movement of the steering wheel 10 with respect to the table or desk top. The frictional members may be removable. The reduction in lateral dimension of the steering wheel 10 in the retracted position is desirable for a number of reasons. For example, it reduces the space required to store or to ship the steering wheel 10. The use of a smaller container or box for shipping can significantly reduce the cost of the product. The reduced size is also beneficial for use on a crowded or small table or desk top. Another advantage is the removal of loose parts from the design, allowing the end user the freedom to have the supports extended for lap use and retracted for desktop use or storage.

Figure 4:
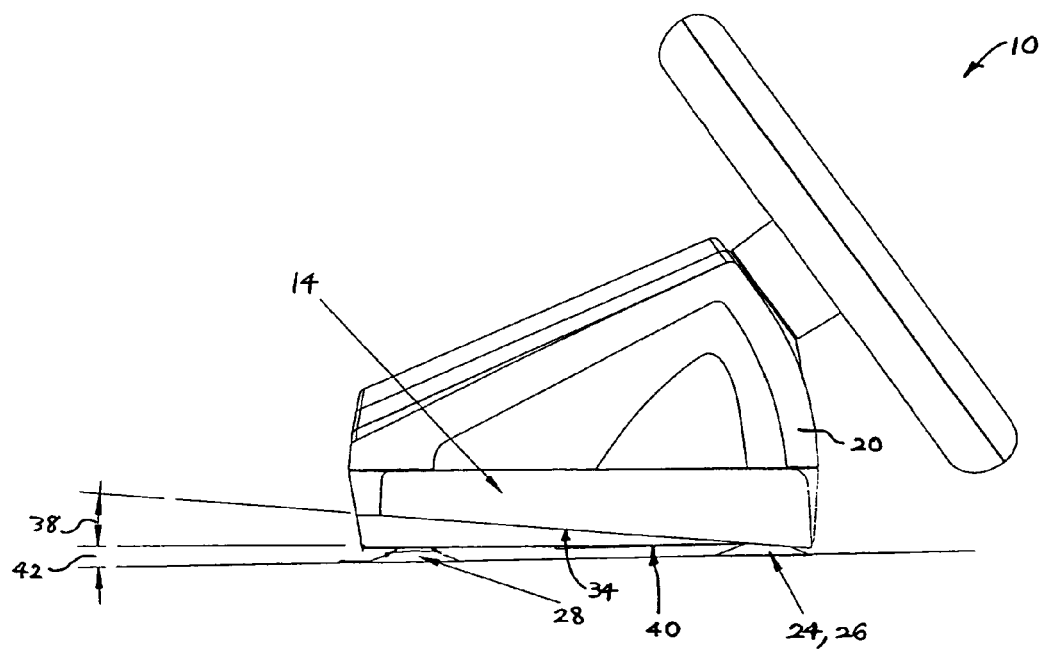
FIG. 4 is a side elevational view of the convertible gaming steering wheel of FIG. 1.
Figure 3:
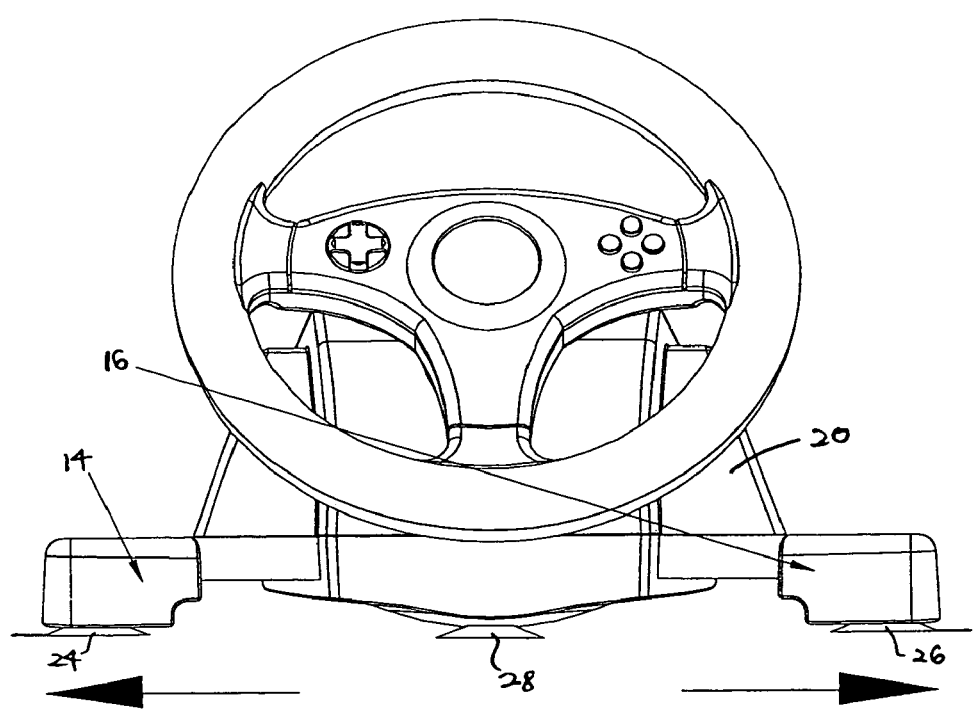
FIG. 3 is a front elevational view of the convertible gaming steering wheel of FIG. 1 showing the slidable supports in an extended position.
Figure 5:
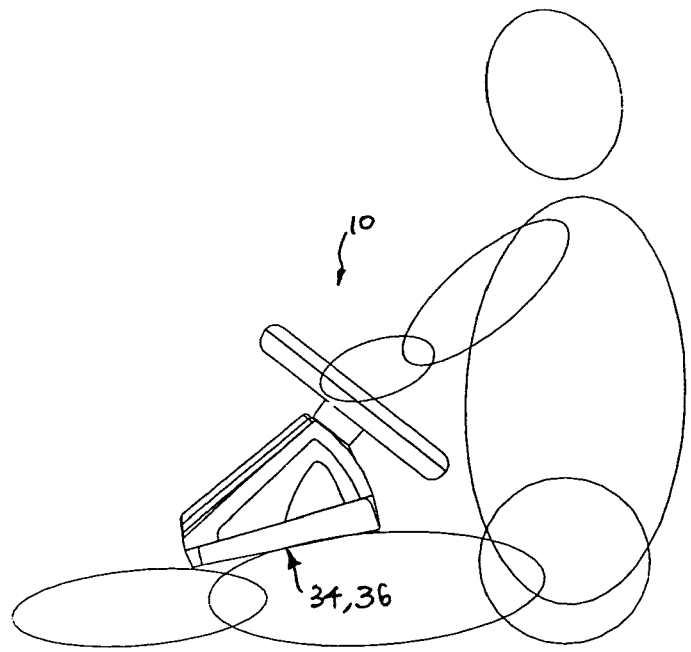
FIG. 5 is a simplified side view schematically illustrating the convertible gaming steering wheel of FIG. 1 support on a user's lap in the extended position.
Figure 6:
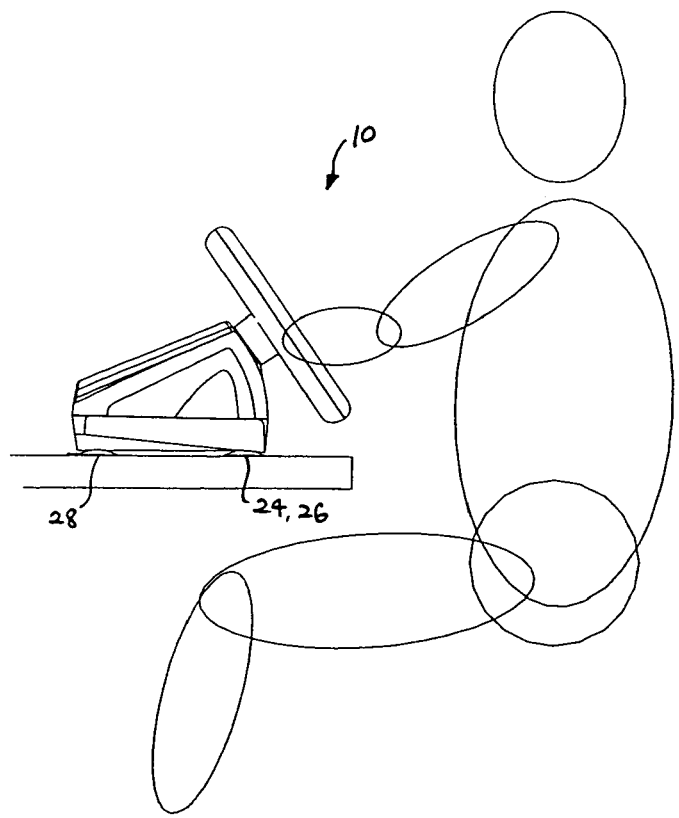
FIG. 6 is a simplified side view schematically illustrating the convertible gaming steering wheel of FIG. 1 support on a desktop in the retracted position.

In the lap mode as seen in FIG. 3, the two support members 14, 16 slide and lock in the out or extended position. The two support members 14, 16 on the left and right sides of the steering wheel body 20 come in contact with the tops of the user's legs while the main body 20 falls between the legs. This configuration improves stability. As shown in FIGS. 1, 4, and 5, the left and right support members 14, 16 have inclined or angled side supporting surfaces 34, 36 rearward of the two side bottom contact locations 24, 26 for contacting the user's legs. As best seen in FIGS. 4 and 5, the inclined side supporting surfaces 34, 36 of the support members 14, 16 form a lap tilt angle 38 with the bottom 40 of the steering wheel housing 20. The lap tilt angle 38 may be about 5–10° or higher. The bottom contact location 28 is lower than the left and right side bottom contact locations 24, 26 to form a desktop tilt angle 42 in the opposite direction. The desktop tilt angle 42 is typically about 2–5°, but may be about 10° or higher. The lap mode as shown in FIG. 5 and the desktop mode as shown in FIG. 6 further illustrate the difference. This different contact surfaces and locations place the steering wheel 10 in the more comfortable position for each situation. The steering wheel 10 leans back and face up toward the user for lap use in the lap mode in FIG. 5 (due to the inclined side support surfaces 34, 36), and leans forward and face out for table top use in the desktop mode in FIG. 6 (due to the lower rear bottom contact location 28 as compared to the two side bottom contact locations 24, 26).

Figure 7:
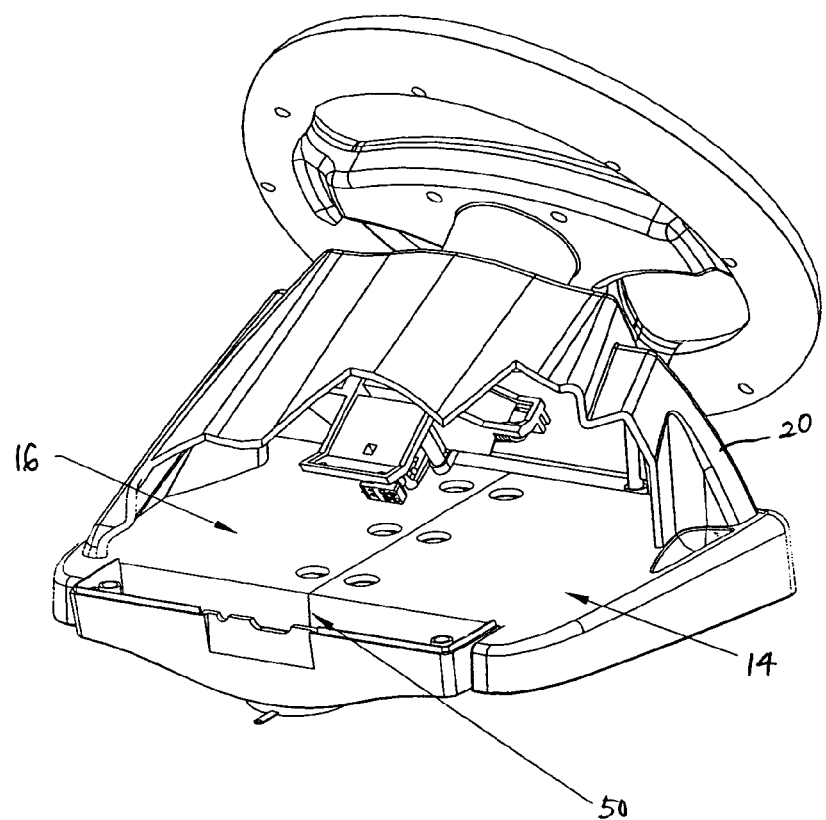
FIG. 7 is a perspective view of the convertible gaming steering wheel of FIG. 1 showing a non-enveloping configuration.
Figure 8:
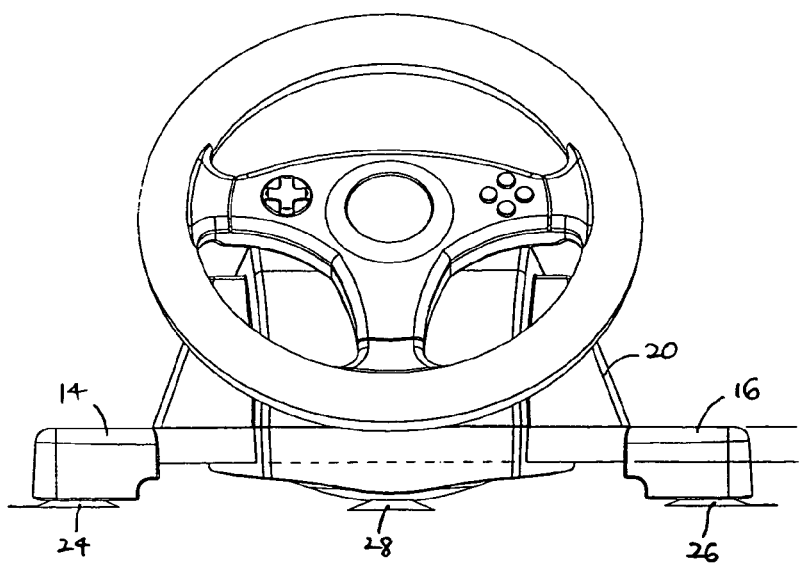
FIG. 8 is a front elevational view of the convertible gaming steering wheel of FIG. 7.
Figure 9:
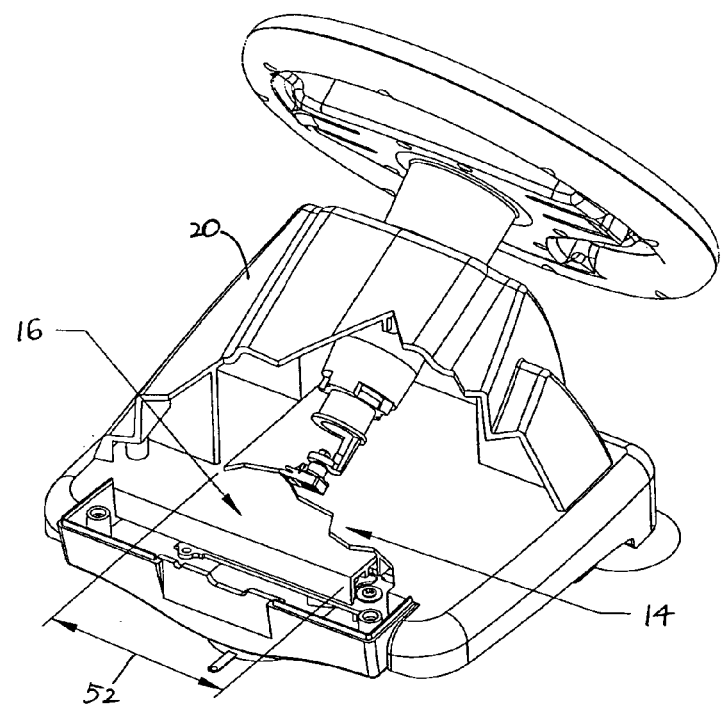
FIG. 9 is a perspective view of a convertible gaming steering wheel showing an enveloping configuration according to another embodiment of the invention.
Figure 10:
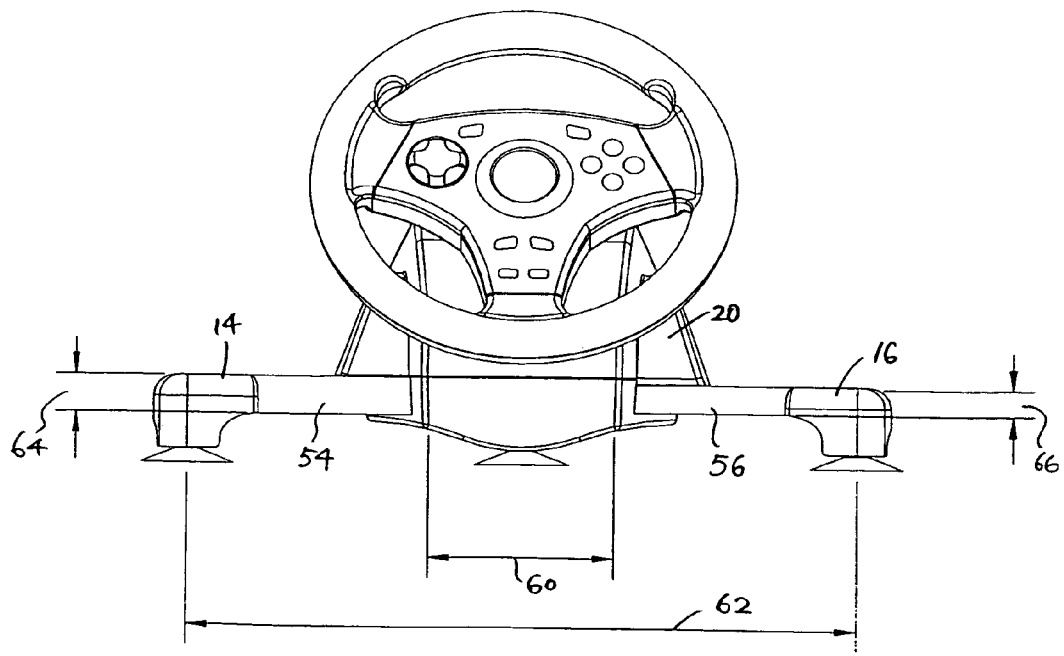
FIG. 10 is a front elevational view of the convertible gaming steering wheel of FIG. 9.

Depending on the size and type of gaming steering wheel design, the retractable support members can take on one of two forms according to specific embodiments of the invention. The first is the non-enveloping configuration of FIGS. 7 and 8; the second is the enveloping configuration of FIGS. 9 and 10. As shown in FIGS. 7 and 8, the support members 14, 16 in the retracted position do not overlap inside the main steering wheel body 20. In the non-enveloping configuration, the edges of the two support members 14, 16 may come in contact inside the steering wheel body 20 at location 50 or may be spaced from one another. In the enveloping configuration of FIGS. 9 and 10, the support members 14, 16 overlap with one another inside the main steering wheel body 20 by an overlap 52 in the retracted mode. This may be accomplished, for example, by providing one of the support members with a narrower or thinner cross-section than the cross-section of the other support member. FIG. 10 shows the right cross-section 56 of the right support member 16 has a thickness 66 which is smaller than the thickness 64 of the left cross-section 54 of the left support member 14. In the retracted mode, the right cross-section 56 slides inside the left cross-section 54 to overlap with one another and form the enveloping configuration. This is desirably used on smaller form factor wheels where the overall width 60 of the main wheel body 20 is narrow and the total extension 62 for comfortable use needs to be sufficiently large to reach across the user's lap.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A convertible game controller device comprising:

a game controller body;

a left support member movably connected to the game controller body, the left support member being movable between a retracted position and an extended position, the left support member being movable inwardly to the right toward the game controller body to the retracted position and outwardly to the left away from the game controller body to the extended position, the left support member having a left support surface at a bottom thereof; and a right support member movably connected to the game controller body, the right support member being movable between the retracted position and the extended position, the right support member being movable inwardly to the left toward the game controller body to the retracted position and outwardly to the right away from the game controller body to the extended position, the right support member having a right support surface at a bottom thereof;

wherein the left support member and the right support member in the extended position are configured to rest on the lap of a user in a lap mode by contacting legs of the user with the left support surface of the left support member and the right support surface of the right support member;

wherein the left support member and the right support member are disposed side-by-side in the retracted position.

2. The device of claim 1 wherein the left support member and the right support member are disposed at least partially inside the game controller body in the retracted position.

3. The device of claim 1 wherein the left support member includes a left side bottom contact location in a front portion of the left support surface and the right support member includes a right side bottom contact location in a front portion of the right support surface, wherein the game controller body includes a rear bottom contact location in a rear portion of the game controller body, and wherein the left side bottom contact location, the right side bottom contact location, and the rear bottom contact location are configured to contact and rest on a desk top in a desktop mode with the left and right support members in the extended position or the retracted position.

4. The device of claim 3 wherein the rear bottom contact location is disposed lower than the left and right side bottom contact locations with respect to a bottom of the game controller body to tilt the game controller body forward by a desktop tilt angle in the desktop mode.

5. The device of claim 4 wherein the desktop tilt angle is about 2–5°.

6. The device of claim 1 wherein the left support surface has a rear portion which is inclined upward with respect to a front portion of the left support member, wherein the right support surface has a rear portion which is inclined upward with respect to a front portion of the right support member, and wherein the inclined left support surface and the inclined right support surface in the extended position are configured to rest on the lap of the user to tilt the game controller body backward by a lap tilt angle in the lap mode.

7. The device of claim 6 wherein the lap tilt angle is about 5–10°.

8. The device of claim 6 wherein a rear part of the game controller body including the rear bottom contact location is disposed between the legs of the user in the lap mode.

9. The device of claim 1 further comprising one or more frictional members coupled to at least one of the left side bottom contact location, the right side bottom contact location, and the rear bottom contact location.

10. The device of claim 1 wherein the left support member is slidable relative to the game controller body and the right support member is slidable relative to the game controller body.

11. A convertible game controller device comprising:
a game controller housing;
a left support member movably connected to the game controller housing, the left support member being movable between a retracted position and an extended position, the left support member being movable inwardly to the right toward the game controller housing to the retracted position and outwardly to the left away from the game controller housing to the extended position, the left support member having a left support surface at a bottom thereof; and
a right support member movably connected to the game controller housing, the right support member being movable between the retracted position and the extended position, the right support member being movable inwardly to the left toward the game controller housing to the retracted position and outwardly to the right away from the game controller housing to the extended position, the right support member having a right support surface at a bottom thereof;
wherein the left support member and the right support member are disposed inside the game controller housing in the retracted position;
wherein one of the left and right support members is received at least partially inside another of the left and right support member in the retracted position.

12. The device of claim 11 wherein the left support surface has a rear portion which is inclined upward with respect to a front portion of the left support member, wherein the right support surface has a rear portion which is inclined upward with respect to a front portion of the right support member, and wherein the inclined left support surface and the inclined right support surface in the extended position rest on the lap of the user to tilt the game controller housing backward by a lap tilt angle in the lap mode.

13. The device of claim 11 wherein the left support member includes a left side bottom contact location in a front portion of the left support surface and the right support member includes a right side bottom contact location in a front portion of the right support surface, wherein the game controller housing includes a rear bottom contact location in a rear portion of the game controller housing, and wherein the left side bottom contact location, the right side bottom contact location, and the rear bottom contact location are configured to contact and rest on a desk top in a desktop mode with the left and right support members in the extended position or the retracted position.

14. The device of claim 13 wherein the rear bottom contact location is disposed lower than the left and right side bottom contact locations with respect to a bottom of the game controller housing to tilt the game controller housing forward by a desktop tilt angle in the desktop mode.

15. A convertible game controller device comprising:
a game controller body;
a left support member movably connected to the game controller body, the left support member being movable between a retracted position and an extended position, the left support member being movable inwardly to the right toward the game controller body to the retracted position and outwardly to the left away from the game controller body to the extended position, the left support member having a left support surface at a bottom thereof; and
a right support member movably connected to the game controller body, the right support member being movable between the retracted position and the extended position, the right support member being movable inwardly to the left toward the game controller body to the retracted position and outwardly to the right away from the game controller body to the extended position, the right support member having a right support surface at a bottom thereof;
wherein the left support member includes a left side bottom contact location in a front portion of the left support surface and the right support member includes a right side bottom contact location in a front portion of the right support surface, wherein the game controller body includes a rear bottom contact location in a rear portion of the game controller body, and wherein the left side bottom contact location, the right side bottom contact location, and the rear bottom contact location are configured to contact and rest on a desk top in a desktop mode with the left and right support members in the extended position or the retracted position;
wherein the rear bottom contact location is disposed lower than the left and right side bottom contact locations with respect to a bottom of the game controller body to tilt the game controller body forward by a desktop tilt angle in the desktop mode;

wherein the left support surface has a rear portion which is inclined upward with respect to a front portion of the left support member, wherein the right support surface has a rear portion which is inclined upward with respect to a front portion of the right support member, and wherein the inclined left support surface and the inclined right support surface in the extended position are configured to rest on a lap of the user to tilt the game controller body backward by a lap tilt angle in a lap mode.

16. The device of claim 15 wherein the desktop tilt angle is about 2–5°.

17. The device of claim 15 wherein the lap tilt angle is about 5–10°.

18. A convertible game controller device comprising:
a game controller body;
a left support member movably connected to the game controller body, the left support member being movable between a retracted position and an extended position, the left support member being movable inwardly to the right toward the game controller body to the retracted position and outwardly to the left away from the game controller body to the extended position, the left support member having a left support surface at a bottom thereof; and
a right support member movably connected to the game controller body, the right support member being movable between the retracted position and the extended position, the right support member being movable inwardly to the left toward the game controller body to the retracted position and outwardly to the right away from the game controller body to the extended position, the right support member having a right support surface at a bottom thereof;
wherein the left support member and the right support member in the extended position are configured to rest on the lap of a user in a lap mode by contacting legs of the user with the left support surface of the left support member and the right support surface of the right support member;
wherein one of the left and right support members is received at least partially inside another of the left and right support member in the retracted position.

19. The device of claim 18 wherein the left support member and the right support member are disposed at least partially inside the game controller body in the retracted position.

20. The device of claim 18 wherein the left support member includes a left side bottom contact location in a front portion of the left support surface and the right support member includes a right side bottom contact location in a front portion of the right support surface, wherein the game controller body includes a rear bottom contact location in a rear portion of the game controller body, and wherein the left side bottom contact location, the right side bottom contact location, and the rear bottom contact location are configured to contact and rest on a desk top in a desktop mode with the left and right support members in the extended position or the retracted position.

21. The device of claim 20 wherein the rear bottom contact location is disposed lower than the left and right side bottom contact locations with respect to a bottom of the game controller body to tilt the game controller body forward by a desktop tilt angle in the desktop mode.

22. The device of claim 21 wherein the desktop tilt angle is about 2–5°.

23. The device of claim 18 wherein the left support surface has a rear portion which is inclined upward with respect to a front portion of the left support member, wherein the right support surface has a rear portion which is inclined upward with respect to a front portion of the right support member, and wherein the inclined left support surface and the inclined right support surface in the extended position are configured to rest on the lap of the user to tilt the game controller body backward by a lap tilt angle in the lap mode.

24. The device of claim 23 wherein the lap tilt angle is about 5–10°.

25. The device of claim 23 wherein a rear part of the game controller body including the rear bottom contact location is disposed between the legs of the user in the lap mode.

26. The device of claim 18 further comprising one or more frictional members coupled to at least one of the left side bottom contact location, the right side bottom contact location, and the rear bottom contact location.

27. The device of claim 18 wherein the left support member is slidable relative to the game controller body and the right support member is slidable relative to the game controller body.

* * * * *